Jan. 8, 1924.  1,479,866
J. MOORES
ARTICLE TRANSFER DEVICE
Filed Aug. 18, 1921   2 Sheets-Sheet 1
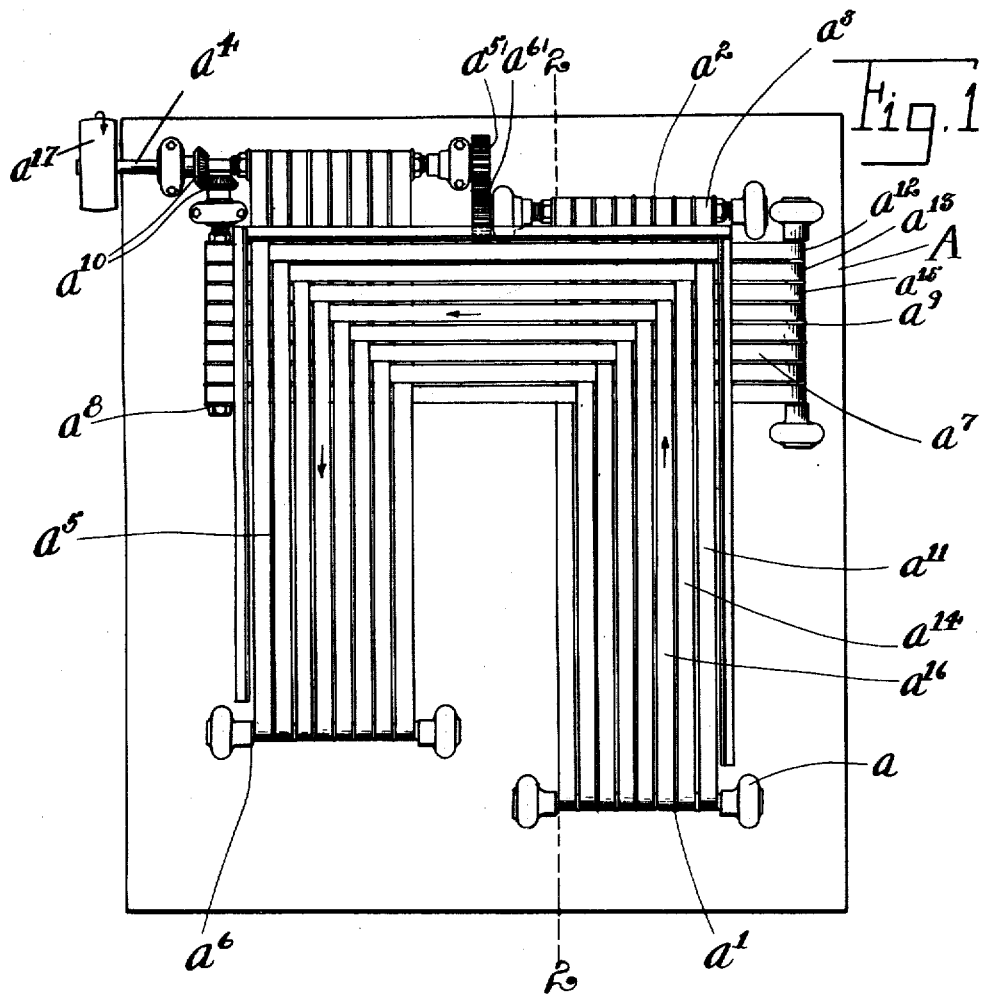
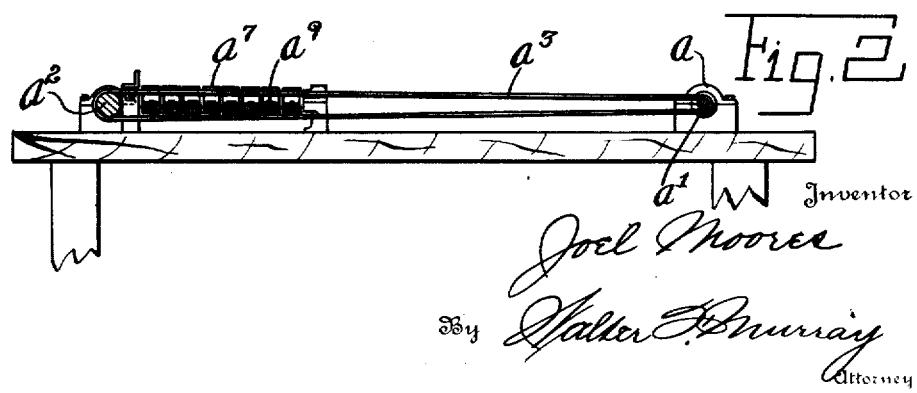

Jan. 8, 1924.  1,479,866
J. MOORES
ARTICLE TRANSFER DEVICE
Filed Aug. 18, 1921  2 Sheets-Sheet 2
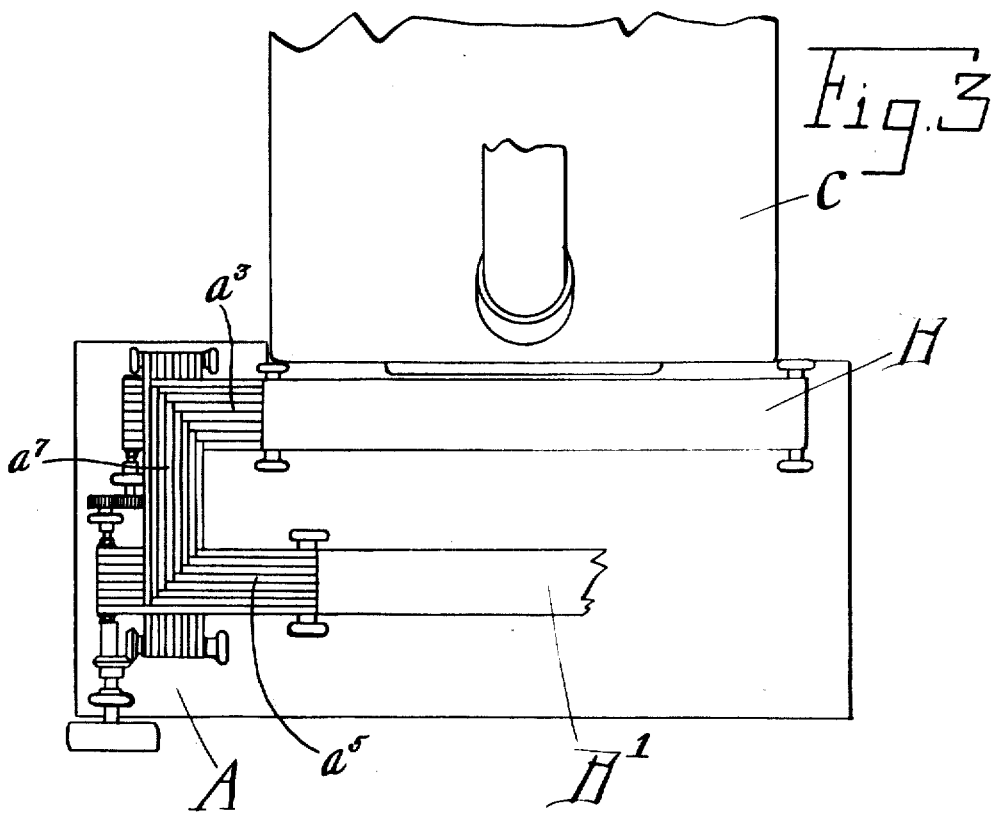

Patented Jan. 8, 1924.

1,479,866

UNITED STATES PATENT OFFICE.

JOEL MOORES, OF NORWOOD, OHIO, ASSIGNOR TO THE J. H. DAY COMPANY, OF CINCINNATI, OHIO, A CORPORATION OF OHIO.

ARTICLE-TRANSFER DEVICE.

Application filed August 18, 1921. Serial No. 493,365.

*To all whom it may concern:*

Be it known that I, JOEL MOORES, a citizen of the United States of America, and a resident of Norwood, in the county of Hamilton and State of Ohio, have invented a new and useful Improvement in an Article-Transfer Device, of which the following is a specification.

My invention relates to devices to be employed to transfer articles from one moving belt to another and has application in cases where baked articles, such as loaves of bread, etc., have motion imparted to them with the object of cooling same.

An object of my invention is to provide a simple and efficient means for transferring the articles from a conveyer or belt to another conveyer or belt.

Another object is to provide a device for the purpose stated that is simple in construction and efficient in operation.

These and other objects are attained by the means described herein and disclosed in the accompanying drawings, in which—

Fig. 1 is a plate view of a device embodying my invention.

Fig. 2 is a sectional view on line 2—2 of Fig. 1.

Fig. 3 is a diagrammatical plane view showing my device in operative relation to a couple of belt conveyers.

My invention comprises primarily a series of sets of parallel belts placed in such relation to one another that articles carried by one set of the parallel belts are removed from said parallel belts by a second set of parallel belts which carry the articles to either a third set of parallel belts or deposits the articles upon a conveyer, such as that which discharged the articles upon the first of the sets of parallel belts.

The frame A has mounted upon it suitable bearings $a$ revolubly supporting the parallel shafts $a'$ and $a^2$, between which extend a set of parallel belts $a^3$. The shaft $a^2$ operatively connects with a drive shaft $a^4$ by means of suitable gears $a^{51}$ and $a^{61}$. The shaft $a^4$ is parallel with the shaft $a^2$ and has extending about it a set of parallel belts $a^5$ which extend between said shaft $a^4$ and a shaft $a^6$ parallel to the shafts enumerated. A set of transverse parallel belts $a^7$ are mounted upon the shafts $a^8$ and $a^9$, disposed substantially at right angles to the shaft $a^4$. The shaft $a^8$ is driven from the shaft $a^4$ by suitable bevel gears $a^{10}$. The several belts extending between the parallel shafts mounting the same are so disposed that each succeeding belt of each set passes between two different belts of at least one of the other sets, for example, belt $a^{11}$ passes below the belt $a^{12}$ or between the belts $a^{12}$ and $a^{13}$. The belt $a^{14}$, parallel to and immediately adjacent to the belt $a^{11}$, passes beneath the belt $a^{13}$ or between the belt $a^{13}$ and the belt $a^{15}$, etc. From this it is apparent that the belt $a^{13}$ will pass below the belt $a^{11}$ and over the belt $a^{14}$, passing between said two belts, and the belt $a^{15}$ will pass below both of the belts $a^{11}$ and $a^{14}$, and will pass over the belt $a^{16}$ disposed immediately adjacent the belt $a^{14}$.

Power is transmitted to the shaft $a^4$ from any suitable source by means of any suitable means such as the pulley $a^{17}$ mounted on the shaft $a^4$. The belts will move in the directions indicated by the arrows in Fig. 1.

The device may be disposed in relation to the endless belts B and B' as shown in Fig. 3. We will assume that the oven C is disposed immediately adjacent the belt B and that as loaves of bread are withdrawn or discharged from the oven, that these loaves are placed upon the belt B. The belt B may be driven from any suitable source and in such direction that the loaves of bread are carried to the first set of parallel belts $a^3$ and are discharged thereupon by the belt B. The loaves of bread are then carried by this set of parallel belts until the set of transverse parallel belts $a^7$ engage the loaves of bread, and move the loaves transversely to the movement of the first mentioned set of parallel belts. The loaves of bread may then be picked up by a third set of parallel belts $a^5$ and be moved parallel to but in an opposite direction from the movement of such loaves of bread when first deposited upon the first set of parallel belts $a^3$. The set of parallel belts $a^5$ will discharge the loaves of bread upon the belt B', which may have at its other end a device similar to the change device shown. Various combinations may be employed, for example, a fourth set of parallel belts may be provided, adapted to carry the loaves of bread back to the belt B and to deposit the loaves of bread upon the lower section of the belt B, whereby such loaves of bread may be carried in both directions by the belt B.

The device can be very advantageously used in transferring articles such as cakes, etc., because of the gentle handling accorded the articles, whereby there is no injury done to the articles when transferred.

What I claim is:

1. In a transfer device the combination of a series of belts extending in parallelism, a second series of belts extending in parallelism with one another and at an angle to the first series of belts, the succeeding belts of each series passing between succeeding belts of the other series.

2. In an article transfer device the combination of a pair of parallel shafts, a set of parallel belts mounted upon the shafts, a second pair of parallel shafts, of which one is disposed on opposite sides of the said set of parallel belts, and a second set of parallel belts extending between the second pair of parallel shafts, the succeeding belts of each set passing between succeeding belts of the other set, and means to drive the shafts.

3. In an article transfer device the combination of two pairs of parallel shafts, a pulley mounted on one of the first pair of shafts, a spur gear and a bevel gear mounted on the shaft bearing the pulley, a spur gear mounted on a parallel shaft of the second pair of shafts engaging the first mentioned spur gear, a series of parallel belts mounted on the shafts of the first and second pairs of shafts, a series of parallel belts extending at an angle to the first two series of parallel belts, the succeeding belts of the last mentioned series of belts passing between the succeeding belts of the first and second mentioned series of belts, parallel shafts mounting the third series of parallel belts, and a bevel gear mounted on one of the third pair of parallel shafts engaging the first mentioned bevel gear.

In testimony whereof, I have hereunto subscribed my name this 15th day of August, 1921.

JOEL MOORES.